United States Patent [19]
Hofmann et al.

[11] Patent Number: 5,413,281
[45] Date of Patent: May 9, 1995

[54] FUEL INJECTION NOZZLE FOR AN INTERNAL COMBUSTION ENGINE

[75] Inventors: Karl Hofmann, Remseck; Johann Warga, Bietigheim-Bissingen, both of Germany

[73] Assignee: Robert Bosch GmbH, Stuttgart, Germany

[21] Appl. No.: 264,269

[22] Filed: Jun. 23, 1994

[30] Foreign Application Priority Data

Aug. 3, 1993 [DE] Germany .................. 43 25 979.0

[51] Int. Cl.⁶ ............................................ F02M 45/02
[52] U.S. Cl. .............................. 239/533.4; 239/533.9
[58] Field of Search ............... 239/533.2, 533.3, 533.4, 239/533.5, 533.6, 533.9

[56] References Cited

U.S. PATENT DOCUMENTS

| | | | |
|---|---|---|---|
| 3,391,871 | 7/1968 | Fleischer et al. | 239/533.4 |
| 3,820,723 | 6/1974 | Shipinski | 239/533.3 |
| 5,205,492 | 4/1993 | Khinchuk | 239/533.9 |
| 5,244,152 | 9/1993 | Hofmann | 239/533.4 |
| 5,267,694 | 12/1993 | Frank et al. | 239/533.5 |

FOREIGN PATENT DOCUMENTS 2083861  9/1980  United Kingdom .
2226078  6/1990  United Kingdom ............. 239/533.9

*Primary Examiner*—Andres Kashnikow
*Assistant Examiner*—Christopher G. Trainor
*Attorney, Agent, or Firm*—Edwin E. Greigg; Ronald E. Greigg

[57] ABSTRACT

A fuel injection nozzle for internal combustion engines having a nozzle body, firmly fastened to a nozzle holder with an interposition of a shim, and a valve needle that is axially displaceable in the nozzle body and that is lifted by the fuel pressure, counter to a closing spring assembly for the injection of fuel. To lend the injection nozzle a slender form, the chamber receiving the closing spring assembly is disposed eccentrically to the nozzle axle and the fuel inlet conduit in the nozzle holder, specifically in the portion of the nozzle holder wall that is thicker as a result of the eccentricity. In order, moreover to transmit the closing force of the closing spring assembly to the valve needle without shear forces as much as possible, a pressure protrusion that transmits the closing force is guided in an aperture extending eccentrically to the nozzle axle (b). The protrusion is integrally joined with an adapter or with the valve needle.

20 Claims, 6 Drawing Sheets

FUEL INJECTION NOZZLE FOR AN INTERNAL COMBUSTION ENGINE

BACKGROUND OF THE INVENTION

The invention is based on a fuel injection nozzle for an internal combustion engine, particularly for a direct-injection Diesel engine, as defined hereinafter. In order to design relatively slender fuel injection nozzles that consume little material, it is already known from German Patent 24 02 574 and German Offenlegungsschrift 31 29 914 to dispose the chamber for receiving the closing spring, embodied as a helical compression spring, in a manner that is axially offset from the nozzle axis in the nozzle holder, so that the nozzle holder wall surrounding the spring chamber is unevenly thick, and to extend the fuel inlet conduit through the thus-achieved thicker sector. To provide that the shear forces, resulting from the eccentrically imposed closing force of the closing spring with respect to the nozzle and nozzle needle axis, will not be transmitted to the nozzle needle, the pressure member supporting the closing spring is embodied as a guide body, which is relatively long in form and is guided by its circumference axially displaceably in the spring chamber. Embodying the pressure member as a guide body is complicated and expensive, and the friction when the guide body is displaced has an unfavorable influence on the closing force of the closing spring.

OBJECT AND SUMMARY OF THE INVENTION

The fuel injection nozzle as defined hereinafter has the advantage that for the eccentricity of the spring force engagement with the valve needle, a relatively large force transmission surface area on the valve needle is available, by way of which shear forces cannot be transmitted. Moreover, the fuel injection nozzle is simple in structure and is easy to assemble.

An especially simple disposition for closing force transmission results from a feature defined hereinafter.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
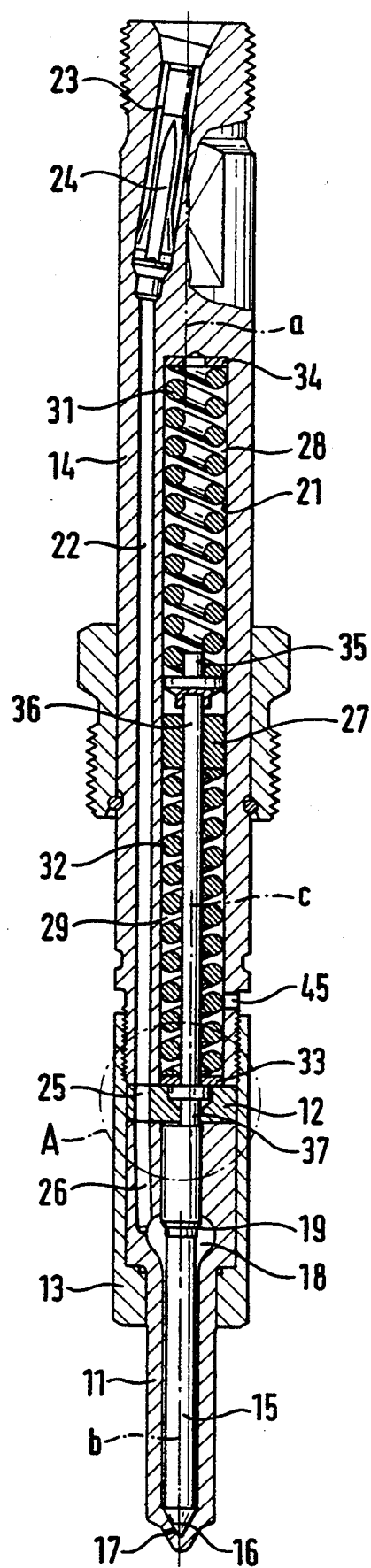
FIG. 1 is a longitudinal section through a fuel injection nozzle with a two-spring nozzle holder.

The first exemplary embodiment is a fuel injection nozzle for preinjection and main injection, of the two-spring holder type. The fuel injection nozzle has a nozzle body 11, which is firmly clamped to a nozzle holder 14 with a union nut 13, with an interposed shim 12. A valve needle 15 is guided coaxially displaceably in a bore in the longitudinal axis b of the nozzle holder 11; it cooperates with an inwardly oriented valve seat 16 in the nozzle body 11. The nozzle body 11 has a plurality of injection ports 17. The guide bore of the valve needle 15 is widened as usual at one point to make a pressure chamber 18, in the region of which the valve needle 15 has a pressure shoulder 19.

The nozzle holder 14 essentially has the form of a slender cylinder, whose axis a is aligned coaxially with the longitudinal axis b of the nozzle body 11 and the valve needle 15, and on its interior has a blind bore 21 that is open toward the shim 12 and whose axis c is parallel-offset by the dimension e from the axes a and b of the nozzle holder 14 and nozzle body 11. Because of the eccentric disposition of the blind bore 21 in the nozzle holder 14, the wall surrounding the blind bore 21 is unevenly thick over its circumference. In the sector having the greatest wall thickness, an inlet conduit 22 penetrates the nozzle holder 14 parallel to the axis of the nozzle holder 14. This inlet conduit 22 adjoins an expanded bore 23 in the adjoining end region of the nozzle holder 14; this bore extends obliquely, and a filter 24 is inserted into it. Axially aligned with the inlet conduit 22 in the nozzle holder 14, an inlet bore 25 penetrates the shim 12, and this inlet bore 25 is adjoined in the nozzle body 11 by an inlet bore 26 leading to the pressure chamber 25.

Approximately half-way up, a false bottom 27 is fixedly placed by wedging in the blind bore 21 of the nozzle holder 14; it divides the blind bore 21 into two spring chambers 28, 29 for receiving two closing springs 31, 32. The closing springs 31, 32 are embodied as cylindrical helical compression springs, whose axes are coaxial with the axis c of the blind bore 21.

Figure 2:
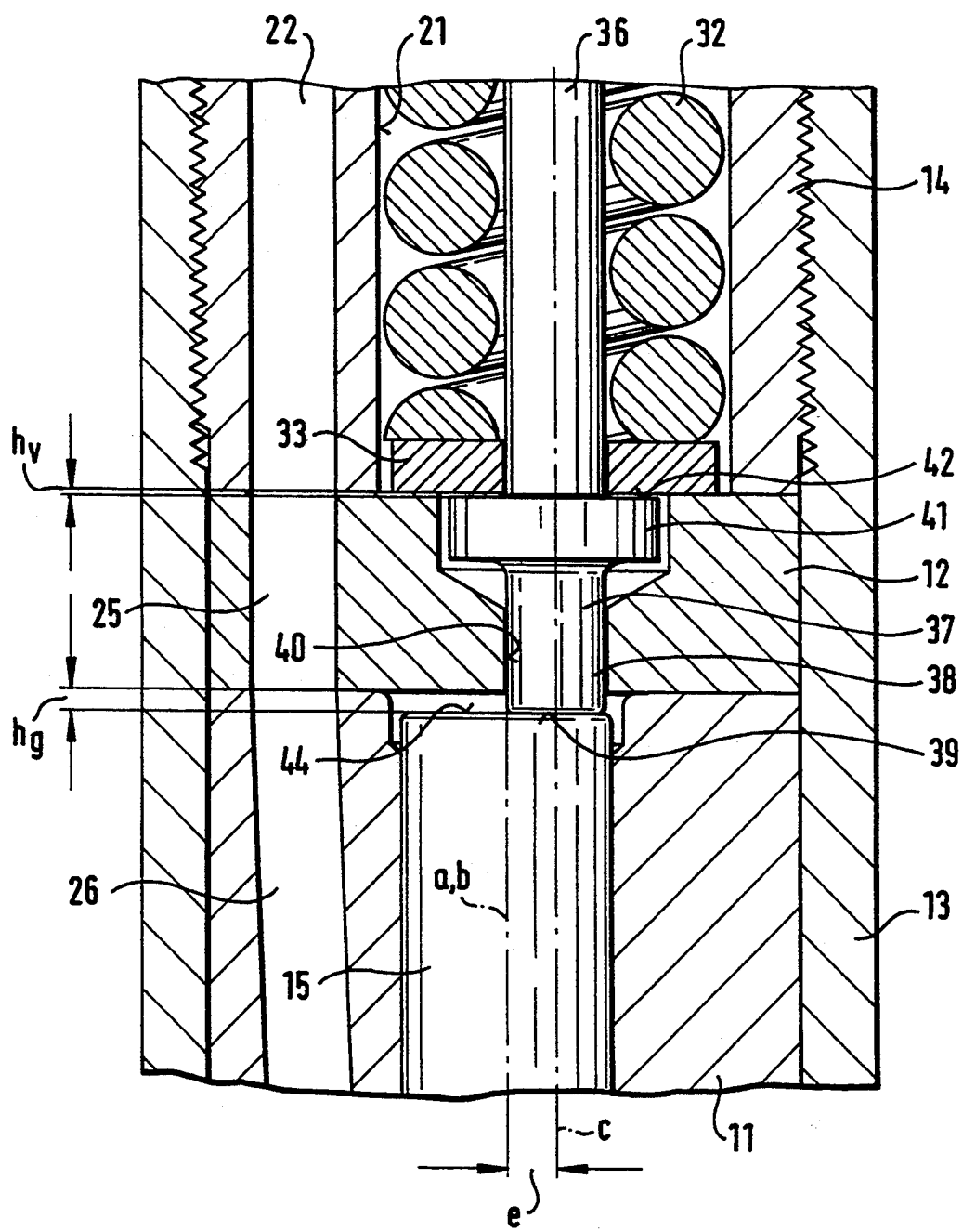
FIG. 2 shows a detail A of FIG. 1 on a larger scale.
Figure 3:
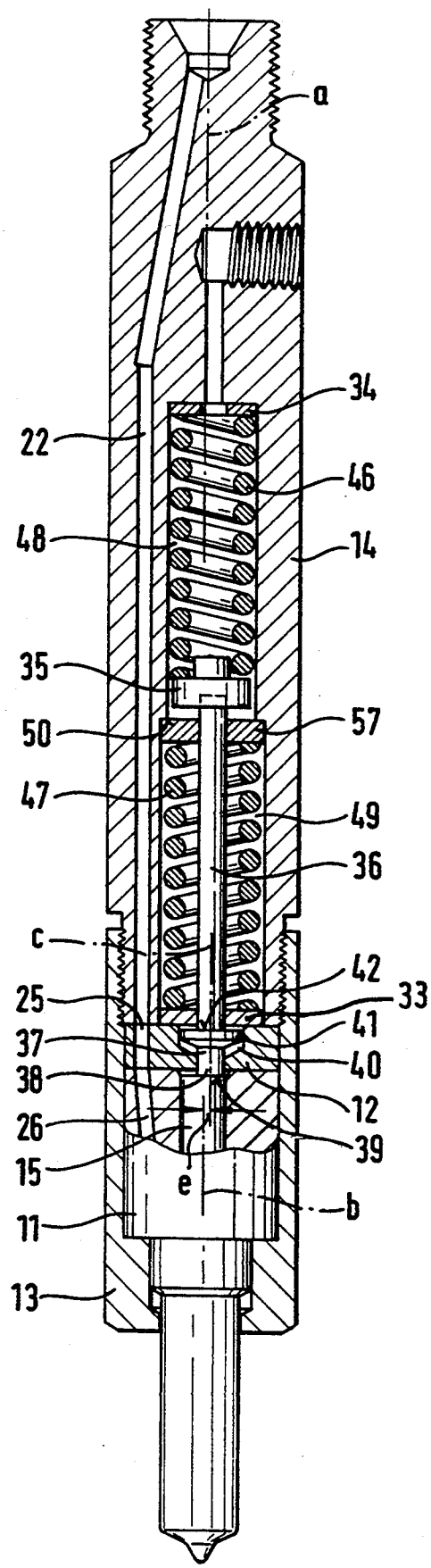
FIG. 3 is a longitudinal section through a second exemplary embodiment of an injection nozzle with a two-spring nozzle holder.

In the above-described exemplary embodiment of FIGS. 1 and 2, the two closing springs 31, 32 have the same diameter, and the second closing spring 32 is supported on the false bottom 27 in the nozzle holder 14. Conversely, the second exemplary embodiment of FIG. 3, which likewise represents an injection nozzle with a two-spring nozzle holder and in which identical parts are identified by the same reference numerals as in the first exemplary embodiment of FIG. 1, has two closing springs 46, 47 of differing diameters. Correspondingly, the spring chambers 48, 49 also have different diameters, with the spring chamber 49 near the nozzle body 11 having the larger diameter. A shoulder 50, on which the second closing spring 47 is supported via a disk 57, is formed at the transition from the second spring chamber 49 to the first spring chamber 48. It should be noted in this connection that a bore with the same diameter can also be machined for the two spring chambers in the nozzle holder 14, and should be formed by an inserted sleeve that is supported on the bottom of the bore.

The first closing spring 31; 46, farther away from the valve needle 15 and supported on the bottom of the blind bore 21 via a disk 34, acts continuously on the valve needle 15 in its closing direction via a pressure pin 35, a pressure rod 36 extending through the false bottom 27, and an adapter 37. The second closing spring 32, 47, which may be embodied identically to the first closing spring 31, is disposed in the chamber 29 near the valve needle 15 and surrounds the pressure rod 36. It is supported at one end on the false bottom 27 and on the other on a pressure disk 33, which in the closing position of the valve needle 15 rests on the face of the shim 12 remote from the valve needle 15. The mushroomshaped adapter 37 has a protrusion 38 with a flat bottom face 39 and a thickened head 41 that likewise has a flat end face 42. This adapter 37 is received in a suitably formed opening 40 in the shim 12, and its protrusion 38 is guided in the aperture 40 displaceably with play, which is dimensioned such that leaking oil can pass through the gap formed by the play. The guide axis of the aperture 40 in the shim 12 is coaxial with the axis c of the blind bore 21 in the nozzle holder 14 and with the axis of the spring system comprising the two closing springs 31, 32 or 46, 47 and the pressure members 35, 36, 37 and 33, so that the operative axis c of the spring system is offset parallel from the axis b of the valve needle 15 by the dimension e. The diameter of the protrusion 38 of the adapter 37, which is embodied as a turned part, (that is, made on the lathe), amounts to approximately half the diameter of the shaft of the valve needle 15. The protrusion 38 of the adapter 37 rests eccentrically with its bottom face 39 on the likewise flat face end 44 of the valve needle 15. The diameter of the protrusion 38 of the adapter 37, the diameter of the valve needle 15, and the eccentricity e of the nozzle axis a, b relative to the spring system axis c are chosen such that the adapter 37 rests with its entire bottom face 39 on the face end 44 of the valve needle 15, and with the circumference of its bottom face 39 either touches or overlaps the nozzle axis a, b. In the closing position of the valve needle 15, the face end 42 of the adapter 37 has a spacing $h_v$ from the opposite side of the pressure disk 33, and the face end 44 of the valve needle 15 has a spacing $h_g$ from the opposite face, forming a stop, of the shim 12. In the injection process, if the fuel pressure in the pressure chamber 18 rises, the valve needle 15 initially executes a prestroke $h_v$, in which only the first closing spring 31 is operative as a counteracting force. During this prestroke $h_v$, a limited preinjection quantity is injected from the injection ports 17. The prestroke $h_v$ ends when the adapter 37 with its end face 42 strikes the pressure disk 32. The valve needle 15 remains in this position until the further-rising fuel pressure overcomes the counteracting forces of the two closing springs 31, 32. After that, the valve needle 15, together with the adapter 37, pressure rod 36 and pressure pin 35 as well as the pressure disk 33, is moved onward in the opening direction, until with its end face 44 it strikes the shim 12, which defines the maximum stroke.

The two spring chambers 31, 32 are pressure-relieved; leaking oil is removed through a transverse bore 45 in the wall of the nozzle holder 14.

Figure 4:
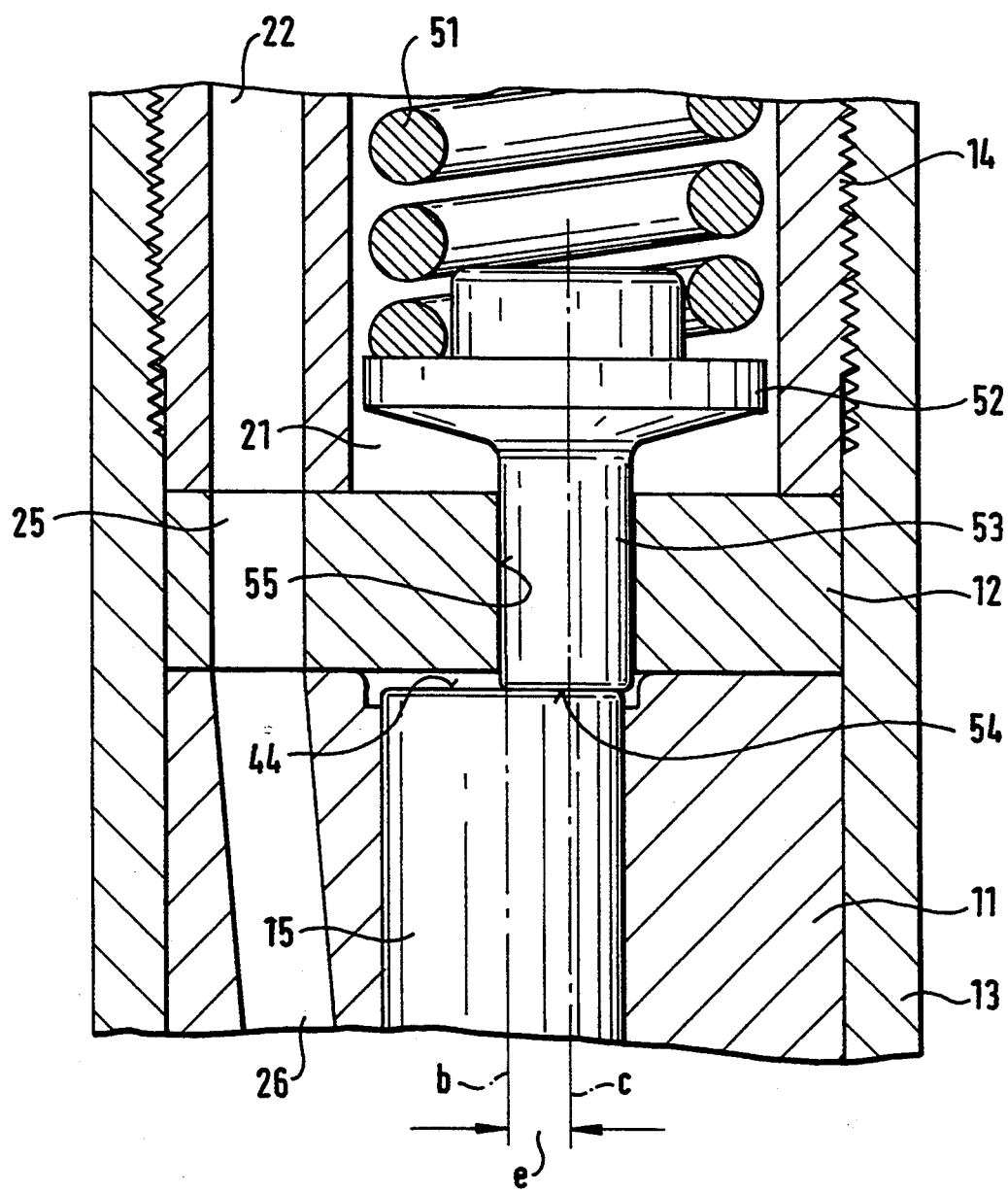
FIG. 4 shows a detail of a fuel injection nozzle with a one-spring nozzle holder in longitudinal section.

The third exemplary embodiment of FIG. 4, in which identical parts to the first exemplary embodiment are provided with the same reference numerals, shows the region of spring force transmission to the valve needle 15 of an injection nozzle having only one closing spring 51. The spring force of the closing spring 51 is transmitted to the valve needle 15 via a pressure pin 52, which has a protrusion 53 that penetrates the shim 12 and has a flat bottom face 54 with which it rests on the flat end face 44 of the valve needle. The protrusion 53 is guided displaceably with play in a cylindrical bore 55 in the shim 12; the axis c of this bore 55 is coaxial with that of the spring system, and the bore 55 is eccentrically disposed by the dimension e relative to the longitudinal axis b of the valve needle 15. The dimensions of the bearing faces and of the eccentricity e are similar to those of the exemplary embodiment of FIGS. 1 and 2.

Figure 5:
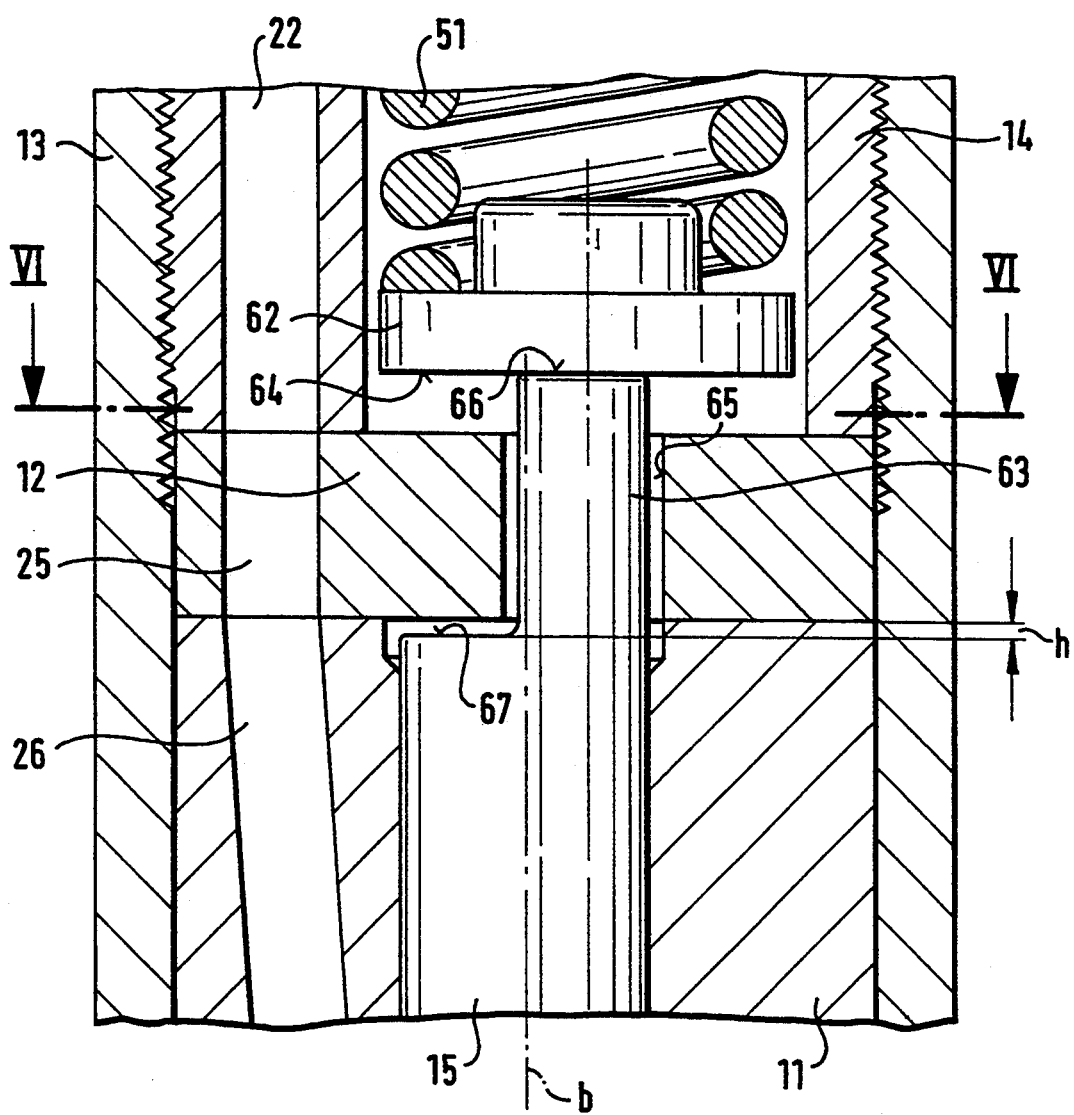
FIG. 5 shows a detail of a different fuel injection nozzle with a one-spring nozzle holder in longitudinal section.
Figure 6:
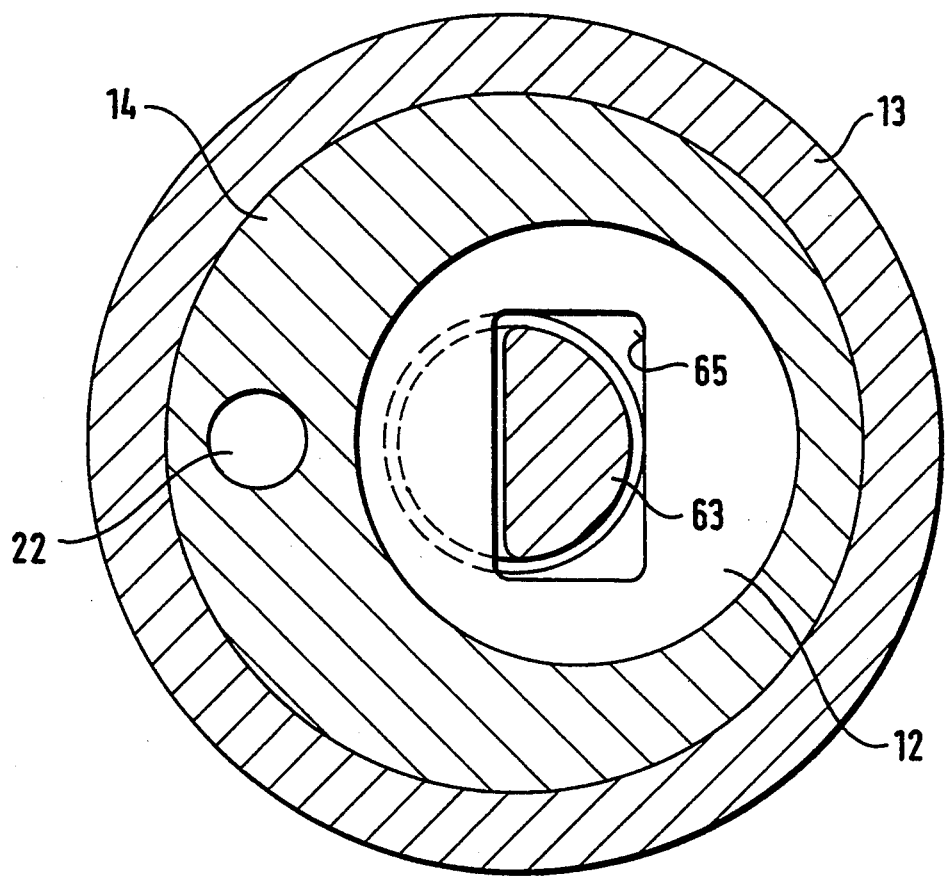
FIG. 6, in a plan view in the plane VI—VI of FIG. 5, shows a shim in the fuel injection nozzle of FIG. 5.

In the exemplary embodiment of FIGS. 5 and 6, in which parts that are identical to those of the two exemplary embodiments described above are provided with the same reference numerals, once again as in the exemplary embodiment of FIG. 4, an injection nozzle having only closing spring 51 is involved. This spring loads the valve needle 15 via a pressure pin 62, whose face end 64 toward the shim 12 is flat. In contrast to the other two exemplary embodiments, a protrusion 63 that protrudes with pronounced play through a substantially rectangular aperture 65 in the shim 12, and on whose face end 66 the pressure pin 62 rests with its end face 64, is formed on the valve needle 15. The center axis or axis of the center of gravity of the protrusion 63 and aperture 65 are also eccentric to the center axis b of the valve needle 15. The protrusion 63 is formed by laterally removing material from the valve needle 15, forming a stop shoulder 67 that strikes the shim 12 upon the maximum stroke h of the valve needle 15. Instead of the cross section of the portion of a circle, as shown, the eccentric protrusion 63 may have a round cross section. In that case, the aperture in the shim likewise has a circular cross section.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A fuel injection nozzle for an internal combustion engine, in particular for a direct-injection Diesel engine, having a nozzle body in which a valve needle that cooperates with a valve seat and is acted upon in the closing direction by a helical compression spring and in the opening direction by the fuel pressure is guided displaceably along a longitudinal axis of the nozzle body; having a nozzle holder coaxially joined to the nozzle body and in which a cylindrical spring chamber open toward the nozzle body is formed, axially offset from the longitudinal axis of the nozzle body, said nozzle body having a thicker wall portion because of the eccentricity of the spring chamber, said spring chamber having said closing spring, and said nozzle body having a fuel inlet conduit disposed in the thicker wall portion; and having a shim fastened coaxially and sealingly in place between the nozzle body and the nozzle holder, which shim is struck with a stop face of the valve needle at a maximum stroke and has an aperture for a protrusion having a free end face, said free end face transmitting the closing force of the helical compression spring to the valve needle, the aperture (40, 55, 65) and the protrusion (38, 53, 63) are disposed in the shim (12) axially offset from the longitudinal axis (b) of the nozzle body (11) and of the valve needle (15), and essentially coaxially with the axis (a) of the closing spring (31, 32; 46, 47; 51).

2. A fuel injection nozzle as defined by claim 1, in which the end face (39, 54, 64) of the protrusion (38, 53, 63), with a portion of its outer peripheral region, receives the longitudinal axis (b) of the nozzle body (11).

3. A fuel injection nozzle as defined by claim 1, in which the protrusion (38, 53) is integrally joined with a pressure member (37) and is displaceably guided in the aperture (40, 55) in the shim (12).

4. A fuel injection nozzle as defined by claim 2, in which the protrusion (38, 53) is integrally joined with a pressure member (37) and is displaceably guided in the aperture (40, 55) in the shim (12).

5. A fuel injection nozzle as defined by claim 3, in which the pressure member (37) on the protrusion (38) has a head (41) and is disposed in the correspondingly embodied aperture (40) of the shim (17).

6. A fuel injection nozzle as defined by claim 4, in which the pressure member (37) on the protrusion (38) has a head (41) and is disposed in the correspondingly embodied aperture (40) of the shim (12).

7. A fuel injection nozzle as defined by claim 1, in which the protrusion (63) is integrally joined to the valve needle (15), said stop face being formed as a stop shoulder (67), and the axis of the protrusion (63) extends eccentrically with respect to the axis (b) of the valve needle (15).

8. A fuel injection nozzle as defined by claim 2, in which the protrusion (63) is integrally joined to the valve needle (15), said stop face being formed as a stop shoulder (67), and the axis of the protrusion (63) extends eccentrically with respect to the axis (b) of the valve needle (15).

9. A fuel injection nozzle as defined by claim 7, in which the protrusion (63) is formed by a lateral removal of material from the valve needle (15).

10. A fuel injection nozzle as defined by claim 8, in which the protrusion (63) is formed by a lateral removal of material from the valve needle (15).

11. A fuel injection nozzle as defined by claim 1, in which two closing springs (31, 32; 46, 47) are disposed in the nozzle holder (14), which upon a stroke of the valve needle (15) act in succession upon the valve needle (15) via a pressure member (37) integrally joined with the protrusion (38).

12. A fuel injection nozzle as defined by claim 2, in which two closing springs (31, 32; 46, 47) are disposed in the nozzle holder (14), which upon a stroke of the valve needle (15) act in succession upon the valve needle (15) via a pressure member (37) integrally joined with the protrusion (38).

13. A fuel injection nozzle as defined by claim 3, in which two closing springs (31, 32; 46, 47) are disposed in the nozzle holder (14), which upon a stroke of the valve needle (15) act in succession upon the valve needle (15) via the pressure member (37).

14. A fuel injection nozzle as defined by claim 4, in which two closing springs (31, 32; 46, 47) are disposed in the nozzle holder (14), which upon a stroke of the valve needle (15) act in succession upon the valve needle (15) via the pressure member (37).

15. A fuel injection nozzle as defined by claim 5, in which two closing springs (31, 32; 46, 47) are disposed in the nozzle holder (14), which upon a stroke of the valve needle (15) act in succession upon the valve needle (15) via the pressure member (37).

16. A fuel injection nozzle as defined by claim 6, in which two closing springs (31, 32; 46, 47) are disposed in the nozzle holder (14), which upon a stroke of the valve needle (15) act in succession upon the valve needle (15) via the pressure member (37).

17. A fuel injection nozzle as defined by claim 7, in which two closing springs (31, 32; 46, 47) are disposed in the nozzle holder (14), which upon a stroke of the valve needle (15) act in succession upon the valve needle (15) via a pressure member (37) integrally joined with the protrusion (38).

18. A fuel injection nozzle as defined by claim 8, in which two closing springs (31, 32; 46, 47) are disposed in the nozzle holder (14), which upon a stroke of the valve needle (15) act in succession upon the valve needle (15) via a pressure member (37) integrally joined with the protrusion (38).

19. A fuel injection nozzle as defined by claim 9, in which two closing springs (31, 32; 46, 47) are disposed in the nozzle holder (14), which upon a stroke of the valve needle (15) act in succession upon the valve needle (15) via a pressure member (37) integrally joined with the protrusion (38).

20. A fuel injection nozzle as defined by claim 10, in which two closing springs (31, 32; 46, 47) are disposed in the nozzle holder (14), which upon a stroke of the valve needle (15) act in succession upon the valve needle (15) via a pressure member (37) integrally joined with the protrusion (38).

* * * * *